Sept. 15, 1964 H. JAFFE ETAL 3,149,232
STABILIZING PIEZOELECTRIC CERAMICS
Filed Aug. 31, 1959
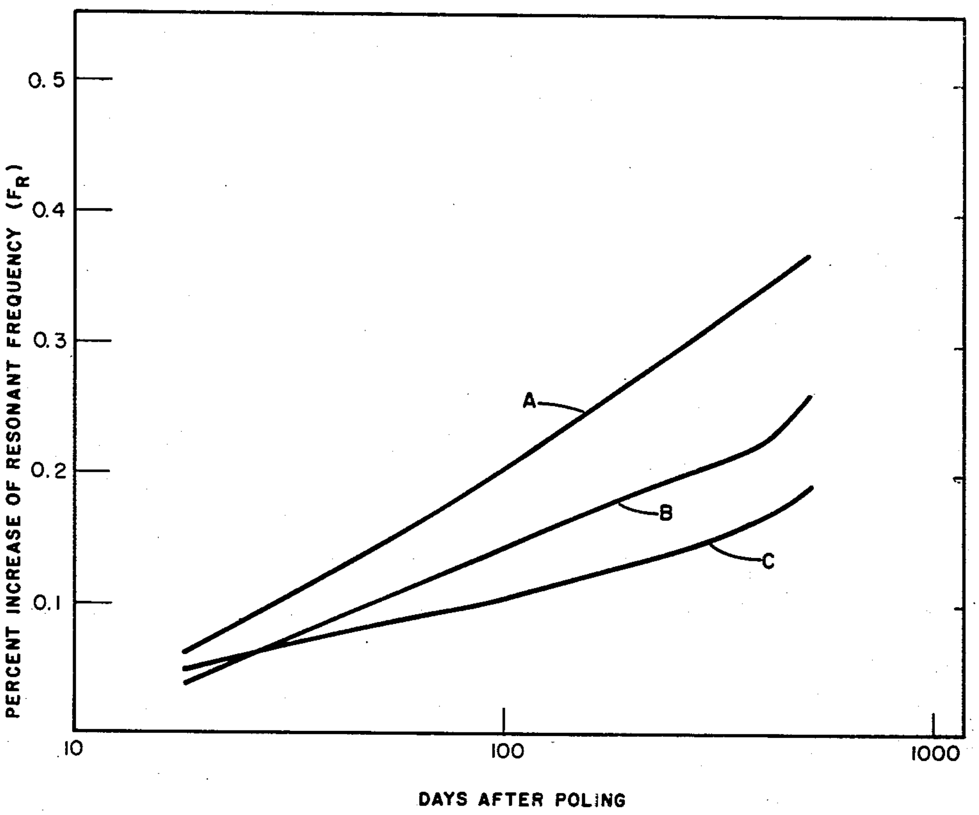
INVENTOR.
HANS JAFFE
HELMUT H.A. KRUEGER
BY
ATTORNEY United States Patent Office 3,149,232
Patented Sept. 15, 1964

3,149,232
STABILIZING PIEZOELECTRIC CERAMICS

Hans Jaffe, Cleveland Heights, and Helmut H. A. Krueger, Willoughby, Ohio, assignors to Clevite Corporation, Cleveland, Ohio, a corporation of Ohio Filed Aug. 31, 1959, Ser. No. 836,961
8 Claims. (Cl. 250—106)

This invention relates to piezoelectric ceramic materials and articles and particularly to methods of treating such materials and articles to improve certain of their properties or characteristics.

The designation "piezoelectric ceramics" as used herein is intended to embrace polycrystalline aggregates of ferroelectric crystals fired to ceramic maturity which have been polarized by the application of an electrostatic field and thereafter exhibit a remanent electromechanical response similar to the piezoelectric effect in crystalline quartz, Rochelle salt, tourmaline and the like. Well-known examples of such ceramics are barium titanate ($BaTiO_3$) as described in United States Letters Patent No. 2,486,560 to R. Gray and lead zirconate titanate solid solutions as disclosed in United States Letters Patent No. 2,708,244 to B. Jaffe.

In the relatively short span of years since the discovery by Gray, piezoelectric ceramics have become increasingly important for the fabrication of transducer elements and have largely replaced monocrystalline materials in some fields. However, ceramic piezoelectric materials have certain disadvantages which limit their usefulness in some areas. Among these disadvantages is the fact that all piezoelectric ceramic materials "age" to a certain degree, that is, they exhibit a change in important physical and electrical properties with the passage of time. For example, barium titanate characteristically shows a marked decrease in dielectric constant and electromechanical coupling factor and an increase in resonant frequency constant with time. This change in properties is a distinct handicap where it is sought to employ the ceramic materials as electromechanical resonators in high quality electric wave filters. Another short-coming of the ceramic materials is the low mechanical quality factor $Q_M$ as compared to quartz, for example.

It is the fundamental object of the present invention to remedy at least one of the disadvantages of ceramic piezoelectric materials as outlined above.

More specifically, it is an object of the invention to provide a method of improving certain characteristic properties of piezoelectric ceramic materials.

Another object is the provision of stable piezoelectric ceramic materials characterized by improved time stability of dielectric constant, frequency constant and planar coupling factor.

Still another object is the provision of methods of stabilizing certain properties of piezoelectric ceramic materials.

A further object is the provision of piezoelectric ceramic materials particularly adapted for the fabrication of resonator elements for electric wave filters.

These and further objects of the invention are accomplished by a method of treating polarized ferroelectric ceramic materials in accordance with the present invention which comprises exposing such materials to a source of gamma radiation, the intensity of the radiation and time of exposure being sufficient to impart to the materials a radiation dosage of from $10^4$ to $10^9$ roentgens.

In accordance with another feature, the invention contemplates stable ceramic transducers comprising polarized ferroelectric ceramics which have been exposed to a gamma radiation dosage of $10^4$ to $10^9$ roentgens.

Additional objects of the invention, its advantages, scope, and the manner in which it may be carried into effect will be more readily apparent from the following description and subjoined claims taken in conjunction with the annexed drawing in which the single figure is a graphical representation of the effect of aging on the resonant frequency of piezoelectric ceramic materials.

Among the best of the piezoelectric ceramics which may be mentioned as examples of the materials to which the present invention is applicable are lead zirconate titanate solid solutions as disclosed and claimed in the aforementioned U.S. Patent No. 2,708,244. These materials have a perovskite or pseudo-cubic lattice structure and, in certain $PbZrO_3:PbTiO_3$ mol ratios, exhibit a remarkably high electromechanical coupling when electrostatically polarized. Many of the electrical and physical properties of lead zirconate titanate ceramics have been improved by chemical modifications. Thus, for example, ceramics of relatively higher permittivity and coercivity are obtained by the substitution of strontium and/or calcium for an appreciable part of the lead in lead zirconate titanate. Modified ceramics of this type are disclosed in U.S. Letters Patent No. 2,906,710.

Modified forms of lead zirconate titanate combining high electromechanical coupling coefficients with high dielectric constant and decreased susceptibility to decay or variation of electrical, electromechanical and physical properties with age and/or temperature are disclosed in U.S. Letters Patent No. 2,911,370. Briefly stated, these ceramic materials consist essentially of lead zirconate titanate with optional substitutions of calcium and/or strontium for lead and containing small quantities of niobium, tantalum, and/or certain rare earth elements in oxidic form.

Perhaps the most desirable of all lead zirconate titanate-base ceramic materials from the standpoint of time and temperature stability of dielectric constant, electromechanical coupling coefficient, and frequency constant are those disclosed in copending application for U.S. Letters Patent Ser. No. 805,985, filed April 13, 1959, now U.S. Patent No. 3,006,857. These ceramic materials are modified by the addition of very small quantities, e.g., 0.2 to 1.5 weight percent, of Group VI–B elements (Cr, U, Mo, W) in oxidic form. Due to their relatively high stability, these materials are particularly suited for use as resonators in electromechanical wave filters.

Another group of ceramic materials of commercial importance which may be cited as examples for use in connection with the invention is barium titanate, as disclosed in the aforementioned U.S. Patent Number 2,486,560, and various chemical modifications thereof, such as barium titanate with substitutions of relatively small quantities of calcium and/or lead.

Piezoelectric ceramics may be prepared in accordance with various ceramic procedures which, in themselves, are well known in the art. Taking the lead zirconate titanate materials as an example, the preferred method of preparation involves the use of lead oxide (PbO), zirconia ($ZrO_2$) and titania ($TiO_2$), all of relatively pure grade combined in proper stoichiometric proportions. Any of the modifying additions in the form of oxides or carbonates may be added at this time. The combined ingredients are then wet or dry milled to achieve thorough mixing and particle size reduction. After milling, the mixture, either loose or suitably formed into desired shapes, is pre-reacted by sintering at a temperature of around 850° C. for approximately two hours. It is desirable to control loss of lead during the heating by suitable means, such as by carrying out the sintering in an enclosure containing a source of lead oxide vapor as explained in the aforementioned U.S. Patent Number 2,708,244. The specific conditions of sintering will, of course, depend on such variable factors as the size and shape of the batch as well as the constituency of the particular mixture in process and may be selected in accordance with established ceramic techniques.

Following the presintering, the reacted material is allowed to cool and reground to a small particle size. Then, depending on preference and the shapes desired, the material may be formed into a mix or slip suitable for pressing, slip casting, or extruding, as the case may be, in accordance with the conventional ceramic procedures.

The samples for which data are given hereinbelow, were prepared using a commercially available binder. The mix was pressed into disks roughly one inch in diameter and two to three millimeters thick which were fired to maturity at a temperature of around 1280° C. for about 45 minutes.

The fired shapes may then be polarized in a manner also well known in the art, for example, by applying electrodes to opposite faces thereof and applying an electrostatic field to the electrodes. Here again the particular conditions of polarization may be varied as desired to suit the particular material and the element configuration. D.C. field strengths of 100 to 175 volts per mil, at room temperature, sustained for one hour will usually provide satisfactory results for lead zirconate titanate ceramics. Other polarizing methods are disclosed and claimed in U.S. Letters Patent No. 2,928,163, assigned to the same assignee as the present invention.

In accordance with the present invention the ceramic elements, fired to maturity and polarized are then subjected to gamma irradiation from a suitable source. Depending on the intensity of the radiation, the time of exposure is adjusted so that the ceramic materials receive a radiation dosage of from $10^4$ to $10^9$ roentgens. Satisfactory results have been obtained with the use of a radioactive isotope source, specifically cobalt 60. The materials are not perceptibly changed in outward appearance by exposure to the radiation nor is there any residual radioactivity. The most pronounced and easily measured effect is the marked increase in the mechanical quality factor $Q_M$. For example, a specimen of unmodified lead zirconate titanate having a $PbZrO_3$:$PbTiO_3$ molar ratio of 53:47 and a typical $Q_M$ of 500 exhibited an increase of over 100 percent in $Q_M$ after a radiation dose of $10^7$ roentgens, While this increase was more drastic than was the usual case, improvements of 50 percent in mechanical quality factor were common with radiation doses of $10^7$ and $10^8$ roentgens. This range of dosage is preferred. With decreased dosages the improvements are not so pronounced and there is no perceptible effect below $10^4$ roentgens. Dosages above $10^9$ roentgens tend to have deleterious effects on the material.

Following is a table of several examples demonstrating the effect of radiation on various ceramic compositions:

| Example No. | Composition | Radiation Dose, Roentgens | $Q_M$ | Electrical Dissipation, percent | Resonant Frequency, Cycles | Capacity, mmfd. |
|---|---|---|---|---|---|---|
| 1 | $Pb(Zr_{0.54}Ti_{0.46})O_3$ | 0 | 588 | 0.46 | 142,336 | 563.0 |
| 1′ | $Pb(Zr_{0.54}Ti_{0.46})O_3$ | $10^7$ | 820 | 0.33 | 142,923 | 541.6 |
| 2 | $Pb(Zr_{0.54}Ti_{0.46})O_3$ | 0 | 588 | 0.45 | 143,340 | 552.0 |
| 2′ | $Pb(Zr_{0.54}Ti_{0.46})O_3$ | $10^8$ | 878 | 0.23 | 144,331 | 518.5 |
| 3 | $Pb(Zr_{0.53}Ti_{0.47})O_3$ | 0 | 500 | 0.35 | 139,805 | 657.4 |
| 3′ | $Pb(Zr_{0.53}Ti_{0.47})O_3$ | $10^7$ | 1007 | 0.27 | 140,509 | 634.1 |
| 4 | $Pb(Zr_{0.58}Ti_{0.42})O_3$ | 0 | 480 | 0.60 | 143,096 | 490.1 |
| 4′ | $Pb(Zr_{0.58}Ti_{0.42})O_3$ | $10^7$ | 611 | 0.44 | 143,353 | 473.0 |
| 5 | $Pb(Zr_{0.58}Ti_{0.42})O_3$ | 0 | 480 | 0.60 | 144,311 | 490.2 |
| 5′ | $Pb(Zr_{0.58}Ti_{0.42})O_3$ | $10^8$ | 666 | 0.41 | 144,849 | 467.2 |
| 6 | $Pb(Zr_{0.54}Ti_{0.46})O_3$+1 wt. percent $La_2O_3$. | 0 | 90.6 | 2.2 | 127,412 | 1,145.9 |
| 6′ | $Pb(Zr_{0.54}Ti_{0.46})O_3$+1 wt. percent $La_2O_3$. | $10^7$ | 112.0 | 1.85 | 128,348 | 1,068 |
| 7 | $Pb(Zr_{0.54}Ti_{0.46})O_3$+1 wt. percent $La_2O_3$. | 0 | 88.7 | 2.41 | 125,861 | 1,210 |
| 7′ | $Pb(Zr_{0.54}Ti_{0.46})O_3$+1 wt. percent $La_2O_3$. | $10^8$ | 127.8 | 1.71 | 127,190 | 1,097 |
| 8 | $Pb(Zr_{0.54}Ti_{0.46})O_3$+1 wt. percent $Nb_2O_5$. | 0 | 93 | 2.03 | 125,387 | 1,421 |
| 8′ | $Pb(Zr_{0.54}Ti_{0.46})O_3$+1 wt. percent $Nb_2O_5$. | $10^7$ | 105.6 | 1.82 | 126,258 | 1,313 |
| 9 | $Pb(Zr_{0.54}Ti_{0.46})O_3$+1 wt. percent $Nb_2O_5$. | 0 | 91.9 | 2.13 | 125,435 | 1,356 |
| 9′ | $Pb(Zr_{0.54}Ti_{0.46})O_3$+ 1 wt. percent $Nb_2O_5$. | $10^8$ | 111.2 | 1.78 | 126,435 | 1,228 |
| 10 | $Pb_{0.97}Sr_{0.03}(Zr_{0.54}Ti_{0.46})O_3$+ 1 wt. percent $La_2O_3$. | 0 | 71.4 | 2.05 | 128,741 | 1,836 |
| 10′ | $Pb_{0.97}Sr_{0.03}(Zr_{0.54}Ti_{0.46})O_3$+ 1 wt. percent $La_2O_3$. | $10^7$ | 93.0 | 1.82 | 129,287 | 1,732 |
| 11 | $Pb_{0.97}Sr_{0.03}(Zr_{0.54}Ti_{0.46})O_3$+ 1 wt. percent $La_2O_3$. | 0 | 71.4 | 2.12 | 127,626 | 1,742 |
| 11′ | $Pb_{0.97}Sr_{0.03}(Zr_{0.54}Ti_{0.46})O_3$+ 1 wt. percent $La_2O_3$. | $10^8$ | 103.0 | 1.84 | 128,759 | 1,615 |

From the foregoing summary of data it will be noticed that the general effects of the radiation are as follows:

(1) The capacitance of all materials tested decreased up to a maximum of 10 percent.

(2) The dissipation factor diminished.

(3) All resonant frequencies increased slightly.

(4) The mechanical quality factor of all materials increased drastically, one as much as 100 percent.

(5) As a general rule the greater total irradiation dose produced a greater change in the measured properties.

In addition to the marked increase in $Q_M$, another of the most important beneficial effects achieved by radiation is the stabilization of properties with respect to time, that is, the minimization of "aging" effects. It is generally found that the aging of ferroelectric ceramics causes a decrease in dielectric constant, an increase in resonant frequency constant and a decrease in coupling and a pronounced increase in mechanical quality factor, which seems to double over a period of several years.

It appears, therefore, that irridation has the same effect on the material as a long period of aging or, in other words, the effect of condensing the aging period into a very brief time. The treatment, therefore, may be considered as "irradiation aging" equivalent to several years of "shelf" or natural aging.

As previously mentioned, the need for stability is most urgent in the case of ceramics used in the fabrication of resonators for electromechanical wave filters. It has also been mentioned that the most stable ceramic material thus far known is lead zirconate titanate modified by additions of Group VI–B elements as disclosed in the aforementioned copending application Ser. No. 805,985. The stability of this material, as well as other piezoelectric ceramics, can be further improved by subjecting them to a heat treatment which consists of heating the material to a relatively high temperature (below the Curie point) and then quenching it in oil at a substantially lower temperature. For lead zirconate titanate ceramics a temperature cycle between 200° C. and room temperature repeated 10 to 12 times is satisfactory. For barium titanate with its lower Curie point (about 105° C.), a lower temperature range, say 100° C. to room temperature, would be necessary.

The single figure of drawing to which reference is now made graphically illustrates and compares the stability of the resonant frequency of disks of the most stable material known (viz., $Pb_{0.95}Sr_{0.05}(Zr_{0.53}Ti_{0.47})O_3$ containing 0.7 weight percent $Cr_2O_3$) for three situations:

(1) No stabilizing treatment (curve A.);
(2) Irridated with gamma rays to a total dosage of $10^8$ roentgens (curve B); and
(3) Both stabilized by temperature cycling and irradiated with gamma rays to a dosage of $10^8$ roentgens (curve C).

For a comparison of curves A, B, and C it will be immediately evident that the irradiation produces a significant improvement in the time stability of the material and this effect is even further enhanced when the irradiation is combined with a prestabilization treatment.

Since gamma radiation is employed, the treated materials contain no residual radioactivity as a result of their exposure. For most applications this is highly desirable, if not absolutely essential. However, it is conceivable that in some applications radioactivity of the material would not be any detriment, as, for example, where the element is to be used in a radiocative environment. In such a case, the invention may be practised in another of its forms which contemplates the incorporation into the material of a radioactive substance which emits gamma rays and consequently maintains the material under effective radiation while in service.

Thus, for example, minute amounts of radium or artificial radioactive isotopes could be compounded into the ceramic mixture in quantities sufficient to give the desired dosage over a preselected period of time.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A method of irradiation aging piezoelectric ceramic materials which comprises exposing such materials to a source of gamma radiation, the intensity of the radiation and time of exposure being sufficient to impart to the material a radiation dosage of from $10^4$ to $10^9$ roentgens.

2. A method of stabilizing piezoelectric ceramic materials which comprises cyclically heating and quenching said ceramic materials and thereafter exposing the materials to a source of gamma radiation, the intensity of the radiation and time of exposure being sufficient to impart to the materials a radiation dosage of from $10^4$ to $10^9$ roentgens.

3. A method of stabilizing piezoelectric ceramic materials selected from the group consisting of barium titanate, lead zirconate titanate and chemical modifications thereof which comprises exposing such materials to a source of gamma radiation, the intensity of radiation and time of exposure being sufficient to impart to the materials a radiation dosage of from $10^7$ to $10^8$ roentgens.

4. A method of stabilizing piezoelectric ceramic materials as defined in claim 3 wherein said source of gamma radiation is a radioactive isotope.

5. A method of stabilizing piezoelectric ceramic materials as defined in claim 4 wherein said radioactive isotope is cobalt 60.

6. A method of stabilizing piezoelectric ceramic materials in accordance with claim 3 wherein the materials are subjected to a prestabilizing heat treatment prior to irradiation, said heat treatment comprising the steps of sequentially heating said materials to a temperature below its Curie point and thereafter quenching the material to a much lower temperature.

7. A method of irradiation aging piezoelectric ceramic materials according to claim 1 wherein said source of of radiation is a radioactive ingredient incorporated in said materials.

8. A piezoelectric ceramic material selected from the group consisting of polarized barium titanate, lead zirconate titanate and chemical modifications thereof containing a radioactive ingredient in sufficient quantity to impart to the material a radiation dosage of from $10^4$ to $10^9$ roentgens in a preselected period of time.

References Cited in the file of this patent

UNITED STATES PATENTS

| | | |
|---|---|---|
| 2,437,913 | Frondel | Mar. 16, 1948 |
| 2,563,503 | Wallace | Aug. 7, 1951 |
| 3,001,880 | Ruskin | Sept. 16, 1961 |
| 3,005,096 | Chynoweth | Oct. 17, 1961 |

FOREIGN PATENTS

| | | |
|---|---|---|
| 278,347 | Great Britain | May 10, 1928 |
| 743,584 | Great Britain | Jan. 18, 1956 |
| 812,056 | Great Britain | Apr. 15, 1959 |

OTHER REFERENCES

Science, Supplement, vol. 101, No. 2625, April 20, 1945; page 12.

Basic Science Research Committee Report, 1956–57; Radiation Effects on Ceramics, Ceramic Bulletin, pp. 372–374, vol. 36, No. 9 (1957).